(12) United States Patent
Tomita

(10) Patent No.: US 8,074,886 B2
(45) Date of Patent: Dec. 13, 2011

(54) SYSTEMS AND METHODS FOR PRESERVING AND MAINTAINING DOCUMENT INTEGRITY

(75) Inventor: Hiroshi Tomita, Palo Alto, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 577 days.

(21) Appl. No.: 12/168,028

(22) Filed: Jul. 3, 2008

(65) Prior Publication Data

US 2008/0265030 A1 Oct. 30, 2008

Related U.S. Application Data

(62) Division of application No. 11/090,224, filed on Mar. 28, 2005, now Pat. No. 7,669,769.

(51) Int. Cl.
*G06K 7/10* (2006.01)
*G06K 9/18* (2006.01)

(52) U.S. Cl. ............ 235/462.09; 235/375; 235/462.01; 235/462.08; 235/462.1; 235/487; 235/494

(58) Field of Classification Search .......... 235/375, 235/456, 472.01–472.03, 462.01–462.47, 235/487, 494

See application file for complete search history.

(56) References Cited

U.S. PATENT DOCUMENTS

| | | | |
|---|---|---|---|
| 5,016,214 A | 5/1991 | Laymoun | |
| 5,107,299 A | 4/1992 | Farrell et al. | |
| 5,243,655 A | 9/1993 | Wang et al. | |
| 5,325,167 A | 6/1994 | Melen | |
| 5,337,362 A | 8/1994 | Gormish et al. | |
| 5,388,158 A | 2/1995 | Berson | |
| 5,486,686 A | 1/1996 | Zdybel, Jr. et al. | |
| 5,490,217 A | 2/1996 | Wang et al. | |
| 5,506,697 A | 4/1996 | Li et al. | |
| 5,544,045 A | 8/1996 | Garland et al. | |
| 5,576,528 A | 11/1996 | Chew et al. | |
| 5,606,609 A | 2/1997 | Houser et al. | |
| 5,612,524 A | 3/1997 | Sant' Anselmo et al. | |
| 5,625,757 A | 4/1997 | Kageyama et al. | |
| 5,671,282 A | 9/1997 | Wolff et al. | |
| 5,680,470 A | 10/1997 | Moussa et al. | |

(Continued)

OTHER PUBLICATIONS

Adobe Acrobat, retrieved from http://en.wikipedia.org/wiki/Adobe_Acrobat on Dec. 19, 2008, 7 pages.

(Continued)

*Primary Examiner* — Thien M. Le
*Assistant Examiner* — Tuyen K Vo
(74) *Attorney, Agent, or Firm* — Finnegan, Henderson, Farabow, Garrett & Dunner, L.L.P.

(57) ABSTRACT

Systems and methods consistent with embodiments of the present invention provide for a method for preserving and maintaining document integrity. In some methods for preserving and maintaining document integrity, the contents of a document, or contents of a document layer may be encoded into a machine-readable form. In some embodiments, the encoded information may be represented using a 2-dimensional bar code. In some methods for preserving and maintaining document integrity, the machine-readable code is printed along with contents of the document based on space available in the document. In some embodiments, a printed document containing the machine-readable code may be scanned and digitized, and content extracted from the scanned data. In some embodiments, the machine-readable code printed on the document is used to recreate layer data from the printed document.

9 Claims, 4 Drawing Sheets

U.S. PATENT DOCUMENTS

| | | | |
|---|---|---|---|
| 5,734,800 | A | 3/1998 | Herbert et al. |
| 5,754,697 | A | 5/1998 | Fu et al. |
| 5,760,382 | A | 6/1998 | Li et al. |
| 5,799,082 | A | 8/1998 | Murphy et al. |
| 5,862,270 | A | 1/1999 | Lopresti et al. |
| 5,905,800 | A | 5/1999 | Moskowitz et al. |
| 5,956,409 | A | 9/1999 | Chan et al. |
| 5,987,153 | A | 11/1999 | Chan et al. |
| 6,035,406 | A | 3/2000 | Moussa et al. |
| 6,082,619 | A | 7/2000 | Ma et al. |
| 6,115,508 | A | 9/2000 | Lopresti et al. |
| 6,173,154 | B1 | 1/2001 | Kucinski et al. |
| 6,212,504 | B1 | 4/2001 | Hayosh |
| 6,285,775 | B1 | 9/2001 | Wu et al. |
| 6,320,982 | B1 | 11/2001 | Kurzweil et al. |
| 6,382,510 | B1 | 5/2002 | Ni |
| 6,418,244 | B2 | 7/2002 | Zhou et al. |
| 6,498,660 | B2 | 12/2002 | Haltmaier |
| 6,522,770 | B1 | 2/2003 | Seder et al. |
| 6,565,003 | B1 | 5/2003 | Ma |
| 6,567,530 | B1 * | 5/2003 | Keronen et al. .............. 382/100 |
| 6,585,434 | B2 | 7/2003 | Arnold et al. |
| 6,615,372 | B1 | 9/2003 | Wang |
| 6,674,456 | B2 | 1/2004 | Miyazaki |
| 6,694,042 | B2 | 2/2004 | Seder et al. |
| 6,694,043 | B2 | 2/2004 | Seder et al. |
| 6,724,494 | B1 | 4/2004 | Danknick |
| 6,839,844 | B1 | 1/2005 | Okano |
| 6,917,724 | B2 | 7/2005 | Seder et al. |
| 6,947,171 | B1 | 9/2005 | Narusawa et al. |
| 7,020,327 | B2 | 3/2006 | Tack-don et al. |
| 7,020,435 | B2 | 3/2006 | Moulthrop et al. |
| 7,032,823 | B2 | 4/2006 | Nojiri |
| 7,040,539 | B1 | 5/2006 | Stover |
| 7,055,746 | B2 | 6/2006 | MacKay et al. |
| 7,088,857 | B2 | 8/2006 | Zuniga |
| 7,118,041 | B2 | 10/2006 | Taylor |
| 7,152,047 | B1 | 12/2006 | Nagel |
| 7,166,347 | B2 | 1/2007 | Inoue et al. |
| 7,185,816 | B1 | 3/2007 | Shoobridge |
| 7,197,644 | B2 * | 3/2007 | Brewington .................. 713/176 |
| 7,354,124 | B2 | 4/2008 | Oshima et al. |
| 7,493,327 | B1 | 2/2009 | Fenelon |
| 7,523,855 | B2 | 4/2009 | Tomita |
| 7,523,865 | B2 | 4/2009 | Tomita |
| 7,533,817 | B2 | 5/2009 | Ming et al. |
| 7,628,330 | B2 | 12/2009 | Tomita |
| 7,669,769 | B2 | 3/2010 | Tomita |
| 7,766,241 | B2 | 8/2010 | Tomita |
| 7,775,435 | B2 | 8/2010 | Tomita |
| 7,823,797 | B2 | 11/2010 | Ming |
| 2001/0001143 | A1 | 5/2001 | Jones et al. |
| 2002/0110798 | A1 | 8/2002 | Kucinski et al. |
| 2002/0164053 | A1 | 11/2002 | Seder et al. |
| 2002/0181736 | A1 | 12/2002 | Seder et al. |
| 2002/0181737 | A1 * | 12/2002 | Seder et al. .................. 382/100 |
| 2003/0120930 | A1 | 6/2003 | Simpson et al. |
| 2004/0003255 | A1 | 1/2004 | Apvrille et al. |
| 2004/0027601 | A1 | 2/2004 | Ito et al. |
| 2004/0145586 | A1 | 7/2004 | Jacobsen |
| 2004/0185424 | A1 | 9/2004 | Kucinski et al. |
| 2004/0199865 | A1 | 10/2004 | Bie et al. |
| 2004/0202386 | A1 | 10/2004 | Quine |
| 2004/0210469 | A1 | 10/2004 | Jones et al. |
| 2004/0212818 | A1 | 10/2004 | Harada |
| 2005/0111034 | A1 | 5/2005 | Karasaki et al. |
| 2005/0111867 | A1 | 5/2005 | Hatano |
| 2005/0132194 | A1 | 6/2005 | Ward |
| 2005/0259876 | A1 | 11/2005 | Ogawa |
| 2005/0284944 | A1 | 12/2005 | Ming |
| 2006/0017802 | A1 | 1/2006 | Yoo et al. |
| 2006/0034505 | A1 | 2/2006 | Luk-Pat et al. |
| 2006/0039034 | A1 | 2/2006 | Iwatani |
| 2006/0055953 | A1 | 3/2006 | Ishii et al. |
| 2006/0055961 | A1 | 3/2006 | Toda |
| 2006/0056735 | A1 | 3/2006 | De Haan |
| 2006/0124744 | A1 * | 6/2006 | Gormish et al. ......... 235/462.08 |
| 2006/0126113 | A1 | 6/2006 | Narazaki |
| 2007/0022053 | A1 | 1/2007 | Waserstein et al. |
| 2007/0036371 | A1 | 2/2007 | Buil et al. |
| 2007/0139710 | A1 | 6/2007 | Ohta |
| 2007/0176000 | A1 | 8/2007 | Cattrone et al. |
| 2007/0176001 | A1 | 8/2007 | Cattrone et al. |
| 2007/0211310 | A1 | 9/2007 | Kadota |
| 2007/0229915 | A1 | 10/2007 | Iida |
| 2007/0241554 | A1 | 10/2007 | Wicker et al. |
| 2008/0016358 | A1 | 1/2008 | Filreis et al. |
| 2008/0048044 | A1 | 2/2008 | Zhao et al. |
| 2008/0080777 | A1 | 4/2008 | Tomita |
| 2008/0114927 | A1 | 5/2008 | Yao et al. |
| 2008/0173718 | A1 | 7/2008 | Ibe |
| 2008/0210758 | A1 | 9/2008 | Ming |
| 2008/0210764 | A1 | 9/2008 | Ming |
| 2008/0216004 | A1 | 9/2008 | Cheng et al. |
| 2008/0265015 | A1 | 10/2008 | Tomita |
| 2009/0031135 | A1 | 1/2009 | Kothandaraman |
| 2009/0194592 | A1 | 8/2009 | Ming et al. |

OTHER PUBLICATIONS

Adobe Photoshop, retrieved from http://en.wikipedia.org/wiki/Adobe_Photoshop on Jan. 3, 2009, 6 pages.

Adobe® 6.0 Acrobat® Curriculum Guide, Adobe, 2003, lessons 3-5, 27 pages.

Altavion, First Amended Complaint, pleading, Dec. 15, 2008, pp. 43, San Mateo County Superior Court, USA.

Konica/Minolta, Cross Complaint, pleading, Oct. 27, 2008, pp. 13, San Mateo County Superior Court, USA.

Altavion, Inc., Complaint, pleading, Nov. 9, 2007, pp. 26, San Mateo County Superior Court, USA.

Antognini, T., A Flexibly Configurable 2D Bar Code, white paper based on paper delivered to the Information Based Indicia Program Technology Symposium, sponsored by the US Postal Service, Nov. 25-26, 1996, 24 pages.

Barcode Introduction: PDF417 Symbology, Barcode Technology Online, retrieved from http://www.barcode-controls.com/PDF417.html on Dec. 19, 2008, 5 pages, EaseSoft Inc.

Computer Dictionary, The Comprehensive Standard for Business, School, Library, and Home, 1994, pp. 106 and 146, Second Edition, Microsoft Press.

Conrad, E., Explanation of The Three Types of Cryptosystems—GIAC Research in the Common Body of Knowledge, Feb. 6, 2007, retrieved from http://www.giac.org/resources/whitepaper/cryptography/52.php (1 of 5) on Dec. 3, 2008, 5 pages.

Data Compression, retrieved from http://en.wikipedia.org/wiki/Data_compression on Dec. 2, 2008, 6 pages.

Data matrix (computer), retrieved from http://en.wikipedia.org/wiki/Data_matrix_(computer) on Dec. 19, 2008, 4 pages.

DataGlyphs® Frequently Asked Questions (FAQ), Palo Alto Research Center Incorporated, retrieved from http://www.parc.com/research/projects/dataglyphs/faq.html on Dec. 18, 2008, 10 pages.

Definitions, Encryption, SearchSecurity.com (powered by WhatIs.com), retrieved from http://searchsecurity.techtarget.com/sDefinition/0,,sid14_gci212062,00.html on Dec. 2, 2008, 4 pages, TechTarget.

Encryption Algorithms, retrieved from http://www.mycrypto.net/encryption/crypto_algorithms.html on Dec. 2, 2008, 3 pages.

Encryption, retrieved from http://en.wikipedia.org/wiki/Encryption on Dec. 2, 2008, 2 pages.

Firth, P. Using Barcodes in Documents—Best Practices, Pegasus Imaging Corporation, 2007, 9 pages.

Gengler, B., Adobe Integrates Secures PDF with XML—Business Software—IT Business Special Report, retrieved from http://www.identrust.com/company/press_releases/2004/release_040615.html on Dec. 1, 2008, dated Jun. 14, 2004, 2 pages, press release in The Australian.

Goebel, G., Data Compression, in the Public Domain, Mar. 1, 2007, v1.2./TOC (3 chapters) Public Domain, retrieved from http://www.vectorsite.net/ttdcmp.html on Dec. 2, 2008, 2 pages.

McDaniel, G., IBM Dictionary of Computing, Aug. 1993, pp. 129 and 235, Tenth Edition, McGraw-Hill, Inc.

McGraw-Hill Dictionary of Scientific and Technical Terms, 2003, p. 548, Sixth Edition, McGraw-Hill.

Pretty Good Privacy, retrieved from http://en.wikipedia.organfiki/Pretty_Good_Privacy on Dec. 11, 2008, 9 pages.
Product Reviews: Design/DTP—Acrobat 4, PC PRO Computing in the Real World, Apr. 2000, Issue 58, retrieved from http://www.pcpro.co.uk/reviews/79/acrobat-4.html on Jan. 14, 2009, 2 pages.
QR Code Barcode (Quick Response Barcode), TechnoRiver, retrieved from http://www.technoriversoft.com/QRCODEBarcode.html on Dec. 18, 2008, 2 pages.
Resnick, P., Standards Track—Internet Message Format, Oct. 2008, 57 pages, The IETF Trust.
Sci-Tech Encyclopedia: Data Compression, 2008, retrieved from http://www.answers.com/topic/data-compression on Dec. 2, 2008, 12 pages.
Sedgewick, J. Image Stitching Using Photoshop, 2003, 4 pages.
Specifications for Popular 2D Bar Codes, Bar Code 1: A Web of Information About Bar Code 2-Dimensional Bar Code Page, retrieved from http://www.adamsl.com/stack.html on Dec. 2, 2008, 9 pages.
The American Heritage Dictionary of the English Language, 2006, p. 44, $4^{th}$ edition, Houghton Mifflin Company.
Tutorial: 1. Introduction to image slicing, How to slice an image, Mar. 22, 2002, 5 pages, Elated Communications Ltd.
Altavion, Second Amended Complaint, May 22, 2009 (49 pages), San Mateo County Superior Court, USA.
Altavion, Notice of Entry on Order Sustaining Defendant's Demurrer to Plaintiff Altavion's Second Amended Complaint, including Exhibit A, Sep. 28, 2009, (7 pages), San Mateo County Superior Court, USA.
Altavion, Konica Minolta's Systems Laboratory, Inc.'s, Konica Minolta Business Solutions, U.S.A., Inc.'s, Konica Minolta Business Technologies, Inc.'s and Paul Catrone's Notice of Demurrer and Demurrer to Altavion, Inc.'s Second Amended Complaint, Jun. 23, 2009, (3 pages), San Mateo County Superior Court, USA.
Altavion, Memorandum of Points and Authorities in Support of Konica Minolta's Systems Laboratory, Inc.'s, Konica Minolta Business Solutions, U.S.A., Inc.'s, Konica Minolta Business Technologies, Inc.'s and Paul Catrone's Notice of Demurrer and Demurrer to Altavion, Inc.'s Second Amended Complaint, Jun. 23, 2009, (20 pages), San Mateo County Superior Court, USA.
Altavion, Request for Judicial Notice of Support of Defendants' Demurrer to Altavion's Second Amended Complaint, Jun. 23, 2009, (3 pages), San Mateo County Superior Court, USA.
Altavion, Declaration of Laura R. Mason in Support of Konica Minolta's Systems Laboratory, Inc.'s, Konica Minolta Business Solutions, U.S.A., Inc.'s, Konica Minolta Business Technologies, Inc.'s and Paul Catrone's Notice of Demurrer and Demurrer to Altavion, Inc.'s Second Amended. Complaint, Jun. 23, 2009, (2 pages), San Mateo County Superior Court, USA.
Altavion, Reply Brief in Support of Defendants' Demurrer to Altavion Inc.'s Second Amended Complaint, Aug. 20, 2009, (15 pages), San Mateo County Superior Court, USA.
Attachment I, Facts Supporting Plaintiff's Claims 4-7 Which are Separate from Plaintiff's Trade Secret Claim 1 [Redacted Portions Filed Under Seal], bearing Aug. 13, 2009 on its face, (6 pages), San Mateo County Superior Court, USA.
CIPA White Paper of CIPA DC-001-2003, Digital Photo Solutions for Imaging Devices, Published by Camera & Imaging Products Association, Feb. 3, 2003 (6 pages).
Office Action dated Aug. 5, 2008, in related U.S. Appl. No. 10/876,608, filed Jun. 28, 2004, Ming et al.
Office Action dated Feb. 18, 2009, in related U.S. Appl. No. 10/876,608, filed Jun. 28, 2004, Ming et al.
Office Action dated Jun. 24, 2009, in related U.S. Appl. No. 10/876,608, filed Jun. 28, 2004, Ming et al.
Office Action dated Nov. 13, 2009, in related U.S. Appl. No. 10/876,608, filed Jun. 28, 2004, Ming et al.
Office Action dated May 21, 2010, in related U.S. Appl. No. 10/876,608, filed Jun. 28, 2004, Ming et al.
Office Action dated Aug. 31, 2010 in related U.S. Appl. No. 10/876,608, filed Jun. 28, 2004, Ming et al.
Office Action dated Nov. 10, 2010 in related U.S. Appl. No. 10/876,608, filed Jun. 28, 2004, Ming et al.
Office Action dated Sep. 5, 2008, in related U.S. Appl. No. 12/058,616, filed Mar. 28, 2008, Ming et al.
Office Action dated Mar. 5, 2009, in related U.S. Appl. No. 12/058,616, filed Mar. 28, 2008, Ming et al.
Office Action dated Jun. 11, 2009, in related U.S. Appl. No. 12/058,616, filed Mar. 28, 2008, Ming et al.
Office Action dated Oct. 6, 2009, in related U.S. Appl. No. 12/058,616, filed Mar. 28, 2008, Ming et al.
Notice of Allowance dated Jun. 25, 2010, in related U.S. Appl. No. 12/058,616, filed Mar. 28, 2008, Ming et al.
Office Action dated Jan. 21, 2009, in related U.S. Appl. No. 12/058,630, filed Mar. 28, 2008, Ming et al.
Office Action dated Sep. 4, 2009, in related U.S. Appl. No. 12/058,630, filed Mar. 28, 2008, Ming et al.
Office Action dated May 25, 2010, in related U.S. Appl. No. 12/058,630, filed Mar. 28, 2008, Ming et al.
Office Action dated Sep. 29, 2010, in related U.S. Appl. No. 12/058,630, filed Mar. 28, 2008, Ming et al.
Office Action dated Jan. 21, 2009, in related U.S. Appl. No. 12/058,639, filed Mar. 28, 2008, Ming et al.
Office Action dated Aug. 18, 2009, in related U.S. Appl. No. 12/058,639, filed Mar. 28, 2008, Ming et al.
Office Action dated May 26, 2010, in related U.S. Appl. No. 12/058,639, filed Mar. 28, 2008, Ming et al.
Office Action dated Sep. 28, 2010, in related U.S. Appl. No. 12/058,639, filed Mar. 28, 2008, Ming et al.
Office Action dated Jun. 12, 2007, in U.S. Appl. No. 10/913,347, filed Aug. 9, 2004, Ming et al.
Office Action dated Feb. 25, 2008, in U.S. Appl. No. 10/913,347, filed Aug. 9, 2004, Ming et al.
Office Action dated Sep. 3, 2008, in U.S. Appl. No. 10/913,347, filed Aug. 9, 2004, Ming et al.
Notice of Allowance dated Jan. 8, 2009, issued in U.S. Appl. No. 10/913,347, filed Aug. 9, 2004, Ming et al.
Office Action dated Sep. 2, 2008, in U.S. Appl. No. 11/090,224, filed Mar. 28, 2005 Ming et al.
Notice of Allowance dated Nov. 13, 2009, issued in U.S. Appl. No. 11/090,224, filed Mar. 28, 2005, Ming et al.
Office Action dated Mar. 19, 2009, in U.S. Appl. No. 12/168,010, filed Jul. 3, 2008, Ming et al.
Notice of Allowance dated Apr. 8, 2010, issued in U.S. Appl. No. 12/168,010, filed Jul. 3, 2008, Ming et al.
Office Action dated Oct. 22, 2010, in U.S. Appl. No. 12/168,000, filed Jul. 3, 2008, Tomita.
Office Action dated Nov. 29, 2007, in U.S. Appl. No. 11/090,229, filed Mar. 28, 2008, Ming et al.
Office Action dated Jun. 12, 2008, in U.S. Appl. No. 11/090,229, filed Mar. 28, 2008, Ming et al.
Notice of Allowance dated Dec. 22, 2008, issued in U.S. Appl. No. 11/090,229, filed Mar. 28, 2005, Ming et al.
Notice of Allowance dated Mar. 26, 2010, issued in U.S. Appl. No. 11/541,138, filed Sep. 29, 2006, Ming et al.
Office Action dated Dec. 11, 2007, in U.S. Appl. No. 11/537,563, filed Sep. 29, 2006, Ming et al.
Office Action dated Jul. 25, 2008, in U.S. Appl. No. 11/537,563, filed Sep. 29, 2006, Ming et al.
Notice of Allowance dated Dec. 23, 2008, issued in U.S. Appl. No. 11/537,563, filed Sep. 29, 2006, Ming et al.
Office Action dated Jan. 28, 2009, in U.S. Appl. No. 11/724,535, filed Mar. 14, 2007, Ming et al.
Notice of Allowance dated Aug. 26, 2009, issued in U.S. Appl. No. 11/724,535, filed Mar. 14, 2007, Ming et al.
Office Action dated Apr. 13, 2011, in related U.S. Appl. No. 10/876,608, filed Jun. 28, 2004, Ming et al.
Office Action dated Jan. 20, 2011, in related U.S. Appl. No. 12/058,630, filed Mar. 28, 2008, Ming et al.
Office Action dated Jan. 20, 2011, in related U.S. Appl. No. 12/058,639, filed Mar. 28, 2008, Ming et al.
Office Action dated Mar. 14, 2011, in U.S. Appl. No. 12/168,000, filed Jul. 3, 2008, Tomita.

* cited by examiner

SYSTEMS AND METHODS FOR PRESERVING AND MAINTAINING DOCUMENT INTEGRITY

This is a divisional application of application Ser. No. 11/090,224, filed Mar. 28, 2005 now U.S. Pat. No. 7,669,769, which is incorporated herein by reference in its entirety for all purposes.

BACKGROUND

1. Field of the Invention

The present invention relates to the field of physical document management and, in particular, to systems and methods for preserving and maintaining the integrity of printed documents.

2. Description of Related Art

Electronic documents, such as those created using many document and/or word processing applications, generally have several layers of data. Each layer in the document, termed a "document layer," contains some information related to the document or its contents. For example, the text seen by an end user creating, editing, or viewing a document may be represented in one layer of a document. Another layer may contain some of the drawings and/or figures that are part of the document. Finally, a third layer may contain the background over which the text and drawings are displayed. One of the advantages of organizing documents in layers is that each layer may be edited and/or created separately from other layers in the document. Thus, a layer may be changed without requiring any change in other layers associated with the document.

In addition to the layers described in the example above, a document may also contain "invisible layers." These invisible layers may contain data pertaining to the document or its contents rather than actual document content that is seen by users. Such data is also often called meta-data. An invisible layer may include, for example, information about people who have edited or viewed any part of the document. Another invisible layer may contain indexing information such as terms that occur frequently in the document. Users editing or viewing the document do not normally see invisible layers. Menus provided by the document processing software may allow a user to explicitly request the information contained in an invisible layer in order to view the contents of that layer.

Invisible document layers may also be used by other applications or the operating system to enforce policies concerning the document. These policies may restrict the people who have access to the document or may prevent applications or users from making changes to portions of the document. Document layers may also be used to authenticate and ensure the integrity of a document. For example, an invisible document layer may contain a digital signature that can be used to establish that an electronic version of a document originated with the entity associated with the digital signature and that no changes were made to the document after it was digitally signed.

Although invisible layer data can be used electronically, for example, to authenticate the content of a document and protect against alteration while it is in electronic form, such protection ceases when the document is printed. Printed documents contain only the actual content of a document, and data stored in document layers is lost. Thus, once a document has been printed, a recipient has no way of determining where the document originated, or where it is stored, or whether the document was altered, even though such information may have been available in document layers.

Preservation of layer data in printed documents would allow recipients of a printed document to automatically recreate preserved layer data, associate the preserved layer data with a document's contents, and facilitate the enforcement and maintenance of policies associated with the printed document.

SUMMARY

In accordance with the present invention, systems and methods for maintaining and securing the integrity of printed documents are presented.

In some methods for preserving and maintaining document integrity, the contents of a document, or contents of a document layer may be encoded. In some embodiments, the encoded information may be stored in a document layer. In some embodiments, the encoded information may be represented using a 2-dimensional bar code. In some methods for preserving and maintaining document integrity, unused space available on each page or section of the document is determined along with the space required to print the encoded information. In some embodiments, if a page has sufficient space to print the code, the encoded information corresponding to a page or a document section may be printed on unused portions of that page or section along with its contents. In some embodiments, if there is insufficient space to print the encoded information on a page or document section, then the encoded information may be printed after all the document content has been printed.

In some methods for preserving and maintaining document integrity, a printed document with encoded information corresponding to contents of pages, or sections of the document, may be scanned and digitized. In some embodiments, the printed encoded information may be in the form of a two-dimensional bar code. In some embodiments, the scanned document data may be processed using character recognition and/or image processing algorithms to extract document content. In some embodiments, additional content may also be extracted from the encoded data printed on the document. In some embodiments, the content extracted from encoded data may be stored in a document layer. These and other embodiments are further explained below with respect to the following figures.

DETAILED DESCRIPTION

In accordance with the present invention, methods and systems are provided for securing and maintaining document integrity. In some embodiments, an encoding is generated for each section of a document and, is based at least in part on the contents of the section and/or on document layers associated with that section. In at least some embodiments, the code may be stored in a document layer, and a representation of the encoded information may be printed along with the document.

In some embodiments, a physical document that does not contain any encoded information may be scanned and digitized. In some embodiments, the scanned document is processed using character recognition and/or image processing algorithms to extract document content. An code may then be generated for various document sections based, at least in part, on the content of those sections, and the document may be printed with a representation of the generated code.

In some embodiments, the space available on each document section and the space needed to print the code are determined. If there is adequate space, the code may be printed on blank or empty portions of the document, such as, for example, the document margins. In some embodiments, if there is inadequate physical space to print the code within the document, the codes may be printed after the last page or last section of the document.

In some methods for preserving and maintaining document integrity, a printed document that includes encoded data may be scanned and digitized. In some embodiments, content may be extracted from the scanned document using character recognition and/or image processing techniques. In some embodiments, content may also be extracted from the encoded data printed on the document. In some methods for preserving and maintaining document integrity, extracted encoded data may be stored as a document layer.

Figure 1:
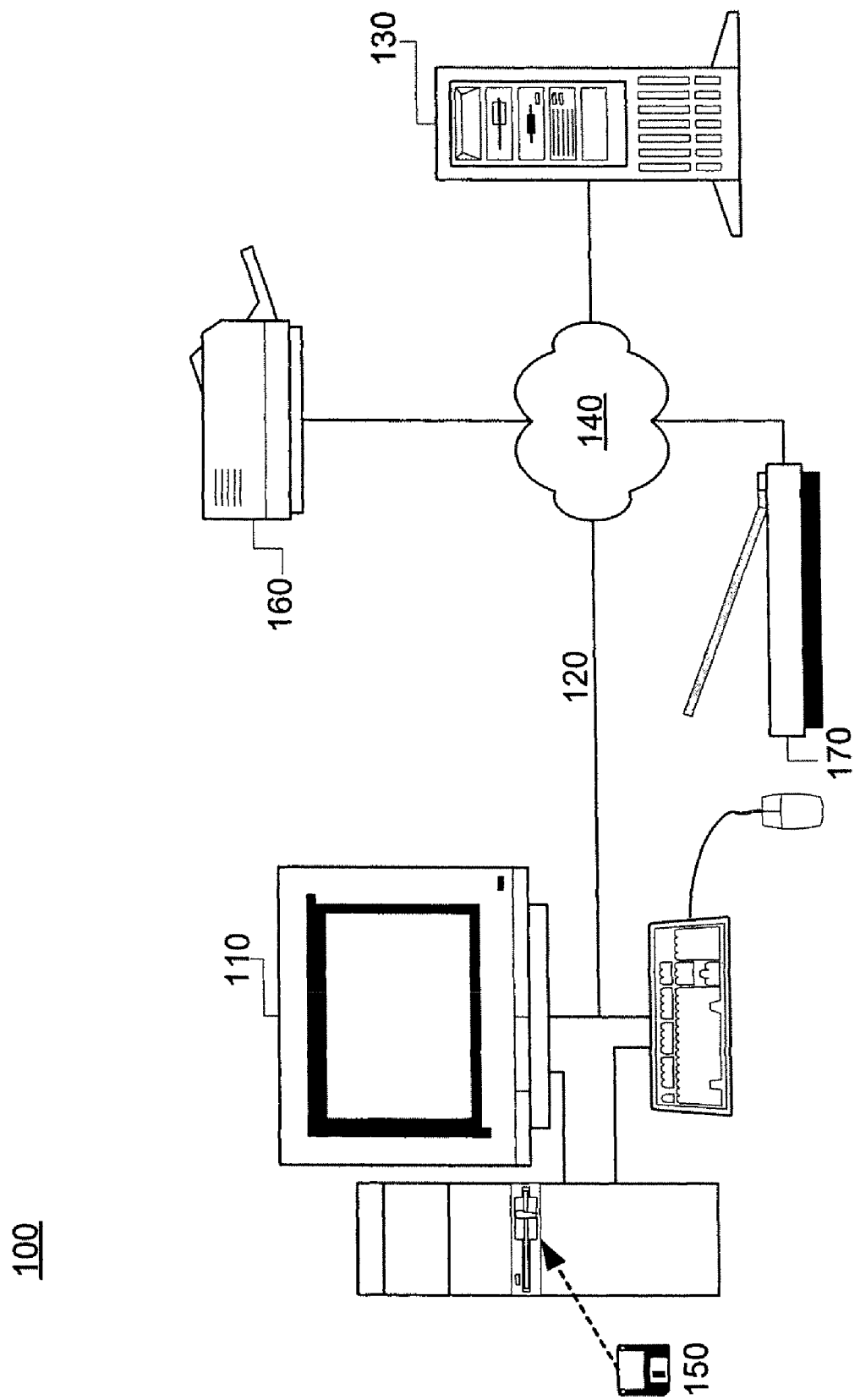
FIG. 1 shows a block diagram of a system for preserving and maintaining document integrity according to some embodiments of the invention.

FIG. 1 illustrates an exemplary system for preserving and maintaining document integrity according to embodiments of the invention. A computer software application consistent with the present invention may be deployed on a network of computers, as shown in FIG. 1, that are connected through communication links that allow information to be exchanged using conventional communication protocols and/or data port interfaces.

As shown in FIG. 1, exemplary system 100 includes a computing device 110 and a server 130. Further, computing device 110 and server 130 may communicate over a connection 120, which may pass through network 140. Computing device 110 may be a computer workstation, desktop computer, laptop computer, or any other computing device capable of being used in a networked environment. Server 130 may be a platform capable of connecting to computing device 110 and other devices (not shown). Computing device 110 and server 130 may be capable of executing document-processing software (not shown) that allows the creation, editing, storing and processing of electronic documents. Document processing software could include commercially available document processing software such as Microsoft Word, Adobe Acrobat, or similar software. Documents created using the document processing software may be stored on computing device 110 or server 130 and made available to an application for preserving and maintaining document integrity according to embodiments of the invention.

Computing device 110 may also comprise removable media drive 150. Removable media drive 150 may include, for example, 3.5 inch floppy drives, CD-ROM drives, DVD ROM drives, CD±RW or DVD±RW drives, USB flash drives, and/or any other removable media drives consistent with embodiments of the present invention. In some embodiments consistent with the present invention, portions of the software application may reside on removable media and be read and executed by computing device 110 using removable media drive 150. In some embodiments, documents processed by applications executing methods for preserving and maintaining document integrity consistent with present invention may be stored on removable media and accessed through removable media drive 150.

Connection 120 couples computing device 110, server 130, printer 160, and scanner 170 and may be implemented as a wired or wireless connection using conventional communication protocols and/or data port interfaces. In general, connection 120 can be any communication channel that allows transmission of data between the devices. In one embodiment, for example, the devices may be provided with conventional data ports, such as Universal Serial Bus ("USB"), Small Computer Systems Interface ("SCSI"), IEEE 1394 High Performance Serial Bus ("Firewire"), and/or coaxial cable ports for transmission of data through the appropriate connection 120. In some embodiments, connection 120 may be a low-bandwidth connection, for example, a Digital Subscriber Line (DSL), an Asymmetric Digital Subscriber Line (ADSL), or a cable connection.

Network 140 may be, for example a Local Area Network (LAN), a Wide Area Network (WAN), or the Internet. In some embodiments consistent with the present invention, information sent over network 140 may be encrypted to ensure the security of the data being transmitted.

Printer 160 and Scanner 170 are connected to network 140 through connection 120. In some embodiments, printer 160 and scanner 170 may be connected directly to computing device 110 and/or server 130. Printer 160 may be used to print documents containing encoded information, such as two-dimensional bar codes, in accordance with some methods for preserving and maintaining document integrity. In some embodiments, the information contained in the document, as well as meta-data information associated with the document, such as indexing information, content descriptions, access lists, times of creation, editing, etc., may be encoded and stored as a document layer. In some embodiments, the encoded information may be printed on paper or other media using a two-dimensional bar code, or other machine-readable formats. In some embodiments, printer 170 may be a color printer capable of printing encoded information in the form of multi-colored two-dimensional bar codes. Documents stored on computing device 110, server 130, or on removable media may be printed on printer 170. Scanner 160 may be used to scan documents, including printed documents containing encoded information, in accordance with some methods of preserving and maintaining document integrity. Both printer 170 and scanner 160 may contain automatic document feeders to allow batch processing of documents. In some embodiments, scanner 160 may be capable of reading machine-readable code printed on documents. In some embodiments, documents scanned using scanner 170 may be stored on computing device 110 and/or server 130 for additional processing.

A computer software application consistent with the present invention may be deployed on any of the exemplary computers, as shown in FIG. 1. For example, computing device 110 could execute software that may be downloaded directly from server 130. In some embodiments a software application implementing methods for preserving and maintaining document integrity may be distributed between the various computing systems shown in FIG. 1.

Figure 2:
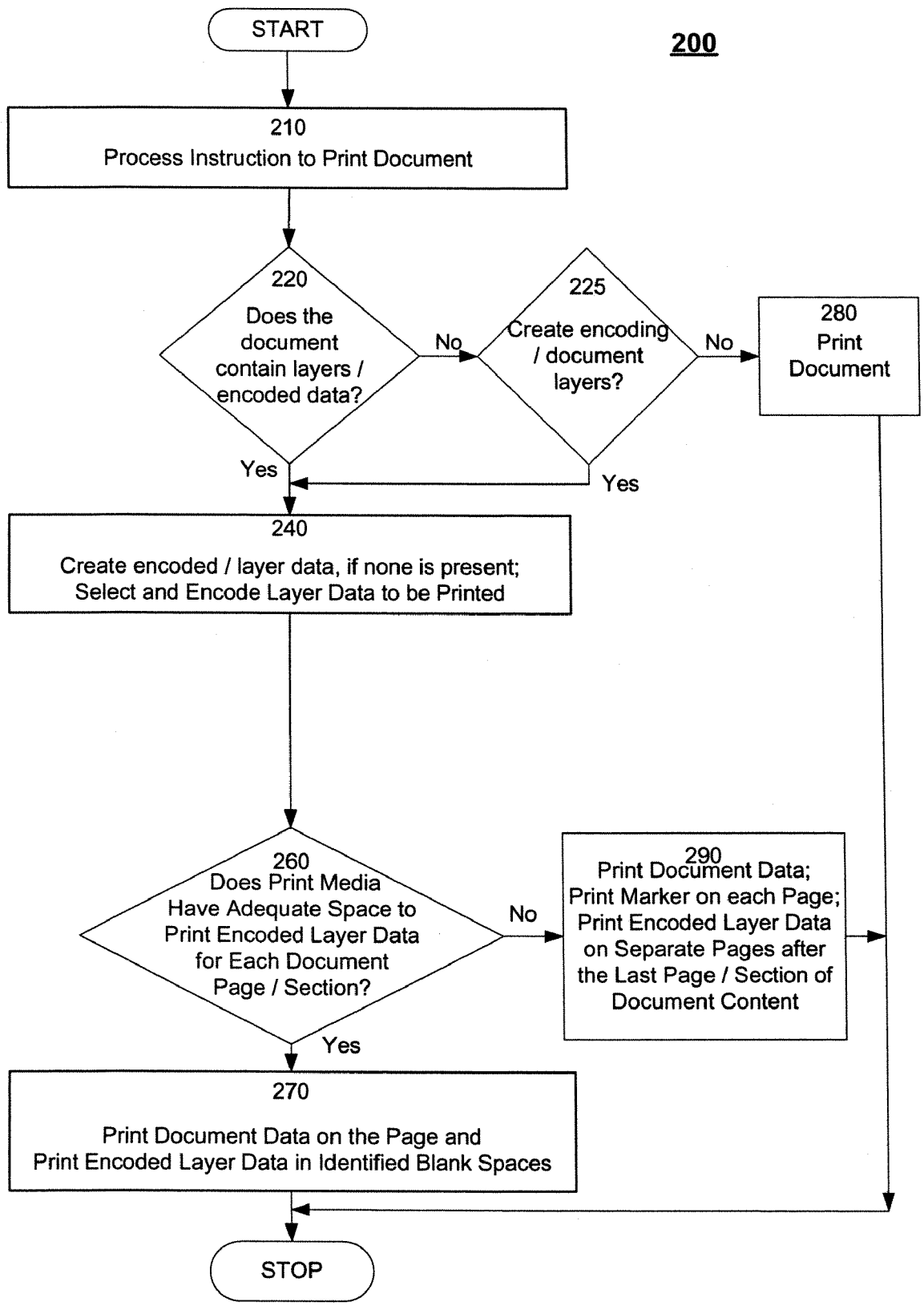
FIG. 2 illustrates a flowchart describing the printing of a document with codes corresponding to the contents of layers associated with document sections, according to some embodiments of the invention.

FIG. 2 is a flowchart describing one exemplary method of printing of a document with codes corresponding to the contents of layers associated with document pages, or sections, according to the invention. In some embodiments, an application implementing steps in flowchart 200 may be executed on computing device 110, or server 130. The application may operate on electronic documents stored on computing device 110 or server 130. In step 210, an instruction to print an electronic document is received by the application. In some embodiments, the application may receive the electronic document from another application, such as a document or word processing program. In some embodiments, the electronic document may have been created using document processing software, and an application executing steps in a method for preserving and maintaining document integrity may be embedded or linked to the document processing system, so that the execution of a "print" command on a document from within the document-processing system may invoke the embedded or linked application according to embodiments of the invention. For example, a user who wants to print an electronic document may be provided with a menu choice that allows the user to preserve layer data in the printed form of the document. If a user elects to preserve layer data in the printed document, the "print" command in the word processing system may invoke the linked application to preserve and maintain the integrity of the document prior to its actual printing. In step 220, the application determines if there is layer data, or encoded information associated with the electronic document. If there is no layer data or encoded information associated with the document, a user may create layer data or, encoded information pertaining to the document in step 225. If a user chooses not to create any layer data pertaining to document information then the contents of the document are printed in step 280. If a user chooses to create layer data pertaining to document information, then in step 225, layer data may be generated for documents that do not have such information associated with them. For example, an index of the contents of each document section may be generated and stored as a document layer. In step 240, if layer data is already present, then some or all of the layer data may be selected for encoding and printing along with the document's contents. For example, information contained in document layers, such as an index of the document's contents, may be encoded and the code associated with the document. When the electronic document is finally printed, the code associated with the document may be represented in the printed version of the document in any machine-readable format, such as for example, a two-dimensional bar code. In the electronic version of a document, the code may be represented electronically in any manner that facilitates the printing of a machine-readable form of the code.

In step 260, the space available on a page to print the code is compared with the space needed to print the code. For example, the space required by a two-dimensional bar code containing the layer data for a page may be compared with the space available in the bottom margin for that page. If there is sufficient space on each page or document section to print the machine-readable code then, in step 270, the code is printed along with the contents of the page or document section. If there is inadequate space to print the machine-readable code, then the code may be printed at the end of the document in step 290. In some embodiments, a machine-readable marker may be printed on each page to indicate that the codes corresponding to each page or document section have been printed following the end of the document. In some embodiments, the marker printed on a page may contain information regarding the location or page number of the machine-readable code for that page.

Figure 3:
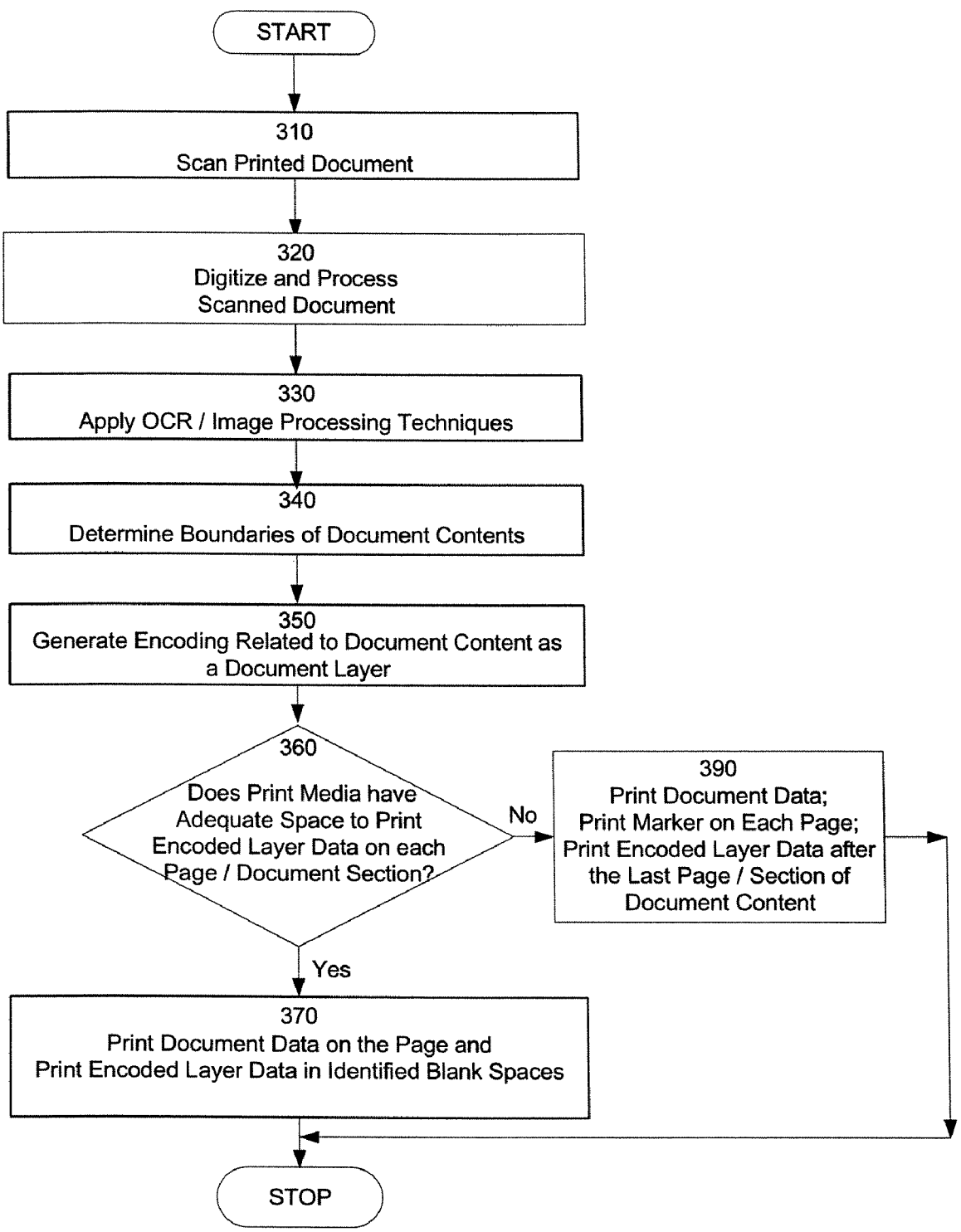
FIG. 3 illustrates a method for adding encoded data to printed documents according to some embodiments of the invention.

FIG. 3 is a flowchart 300 illustrating the steps of an exemplary method adding encoded data or layer information to printed documents according to some embodiments of the invention. In some embodiments, steps in flowchart 300 may be performed by computing device 110 or server 130. In step 310, the printed document is scanned by, for example, scanner 160. In step 320, the scanned data is digitized and processed. In some embodiments, some initial processing of the scanned document may occur at scanner 160, before the scanned document transferred to computing device 110 or server 130. For example, the scanner may translate the scanned document into an image format requested by the application, such as the Portable Document Format ("PDF") or the Tagged Image File Format ("TIFF"). In step 330, the scanned document is processed further using standard character recognition and/or image processing techniques. Character recognition algorithms are well known and widely used, and may include, for example, Optical Character Recognition (OCR) techniques, which apply algorithms that use fonts, distance and/or feature points to extract content from scanned images. In some embodiments, the scanned image may also be processed using well-known image processing algorithms. For example, object segmentation techniques may used to construct and extract document objects from aggregations of pixels. In step 340, image processing techniques may be used to determine the physical boundaries of the content in the scanned document, or to identify blank spaces on document pages or sections.

In step 350, the extracted document content may be processed to generate additional information pertaining to the document. For example, an index may be created based on the contents of the documents. In general, the type of information created may depend on a variety of factors, such as the nature of the document, user applications, and user-defined policies associated with the document. In some embodiments, additional information that is generated may be encoded into machine-readable code and stored as a document layer.

In step 360, the space available on each page or document section is compared with the size need to print the machine-readable code. If there is sufficient space on each page or document section to print the machine-readable code then, in step 370, the code is printed along with the contents of the page or document section. If there is inadequate space to print the machine-readable code, then the code may be printed at the end of the document, in step 390. In some embodiments, a machine-readable marker may be printed on each page to indicate that the codes corresponding to each page or document section have been printed following the end of the document. In some embodiments, the marker printed on a page may contain information regarding the location, or page number of the machine-readable code for that page.

Figure 4:
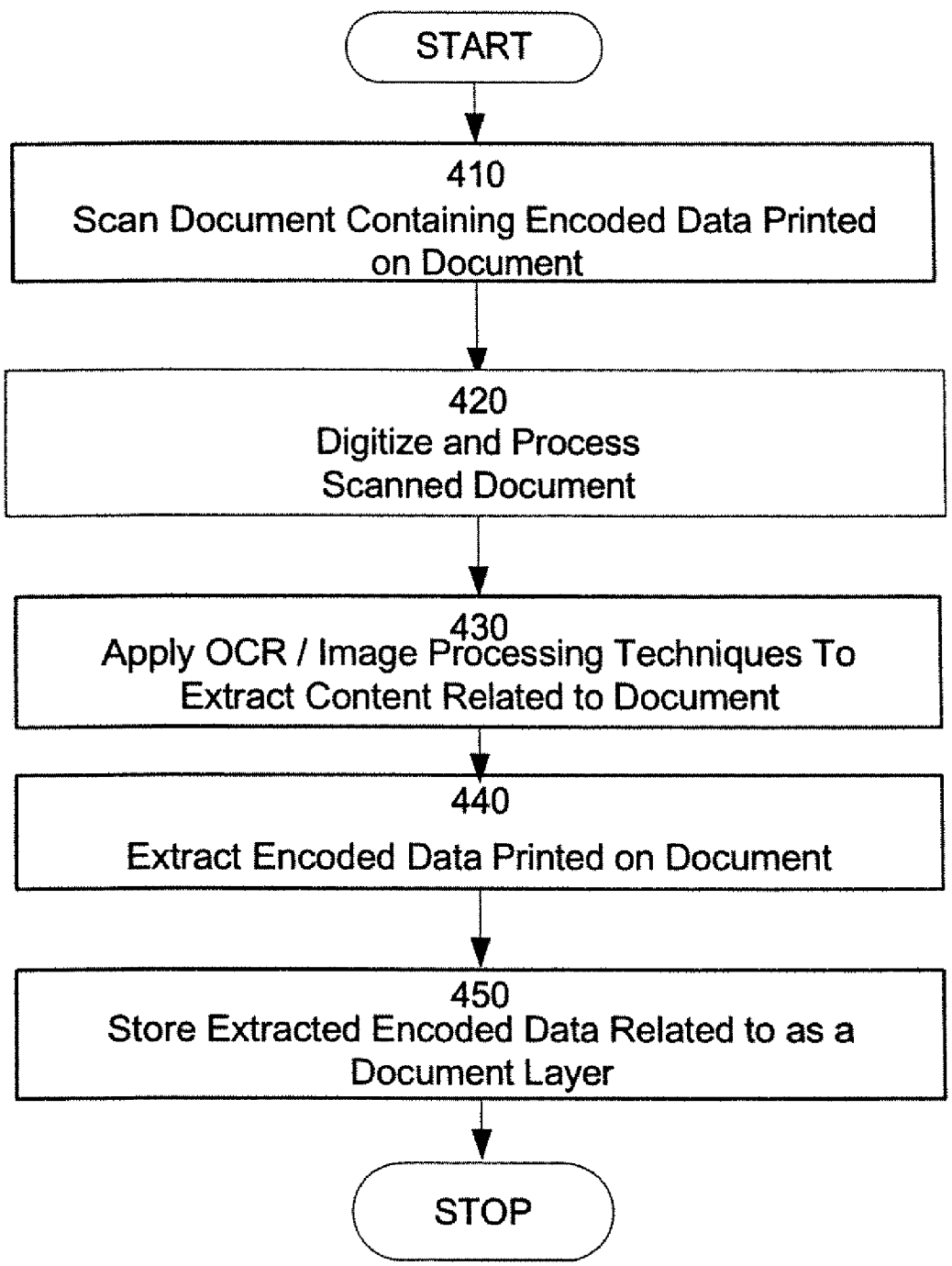
FIG. 4 depicts a flowchart for extracting layer data from a printed document according to some embodiments of the invention.

FIG. 4 depicts a flowchart for extracting layer data from a printed document containing encoded information according to some embodiments of the invention. In some embodiments, steps in flowchart 400 may be performed by components depicted in system 100 under the control of an application program running on computing device 110 or server 130. In step 410, the printed document containing machine-readable code is scanned. In some embodiments, scanning of the document may be performed by scanner 160. In some embodiments, scanner 160 may also be capable of reading the machine-readable code, such as an exemplary two-dimensional bar code, printed on documents. In step 420, the scanned data is digitized and processed. In step 430, the scanned document is processed further using standard character recognition and/or image processing techniques. Character recognition algorithms include, for example, Optical Character Recognition (OCR) techniques, which apply algorithms that use fonts, distance, and/or feature points to extract content from scanned images. In some embodiments, the scanned image may also be processed using well-known image processing algorithms. For example, object segmentation techniques may used to construct and extract document objects from aggregations of pixels. In step 440, the encoded machine-readable code printed on the document may be extracted and/or processed. For example, a two-dimensional bar code may be processed to extract information pertaining to the document. In step 450, the information contained in, and extracted from, the machine-readable code printed on the document is stored with the document. In some embodiments, the document and the code may be stored as document layers.

Further, methods consistent with embodiments of the invention may conveniently be implemented using program modules, hardware modules, or a combination of program and hardware modules. Such modules, when executed, may perform the steps and features disclosed herein, including those disclosed with reference to the exemplary flow charts shown in the figures. The operations, stages, and procedures described above and illustrated in the accompanying drawings are sufficiently disclosed to permit one of ordinary skill in the art to practice the invention. Moreover, there are many computers and operating systems that may be used in practicing embodiments of the instant invention and, therefore, no detailed computer program could be provided that would be applicable to these many different systems. Each user of a particular computer will be aware of the language, hardware, and tools that which are most useful for that user's needs and purposes.

The above-noted features and aspects of the present invention may be implemented in various environments. Such environments and related applications may be specially constructed for performing the various processes and operations of the invention, or they may include a general-purpose computer or computing platform selectively activated or reconfigured by program code to provide the functionality. The processes disclosed herein are not inherently related to any particular computer or other apparatus, and aspects of these processes may be implemented by any suitable combination of hardware, software, and/or firmware. For example, various general-purpose machines may be used with programs written in accordance with teachings of the invention, or it may be more convenient to construct a specialized apparatus or system to perform the required methods and techniques.

Embodiments of the present invention may be implemented as computer-readable media that include program instructions or program code for performing various computer-implemented operations. The program instructions may be those specially designed and constructed for the purposes of the invention, or they may be of the kind well known and available to those having skill in the computer software arts. Examples of program instructions include, for example, machine code, such as produced by a compiler, and files containing a high-level code that can be executed by the computer using an interpreter.

Other embodiments of the invention will be apparent to those skilled in the art from consideration of the specification and practice of the embodiments of the invention disclosed herein. It is intended that the specification and examples be considered as exemplary only, with a true scope and spirit of the invention being indicated by the following claims. As such, the invention is limited only by the following claims.

The invention claimed is:

1. A method of retrieving content and meta-data associated with the content from at least one page of a printed document containing document content data and a first machine-readable encoding on one face of the at least one page, the method comprising:
   scanning the face of the at least one page of the printed document containing the document content data and the first machine-readable encoding;
   processing the scanned document data to extract document content;
   processing the scanned first machine-readable encoding to extract document meta-data, wherein the first machine-readable encoding encodes the location of a second machine-readable encoding on a second page containing document meta-data; and
   associating the extracted document meta-data with the extracted document content for the face of the at least one page of the printed document.

2. The method of claim 1, wherein scanning the face of the at least one page of the printed document further comprises reading the document content data and the first machine-readable encoding on the printed document.

3. The method of claim 1, wherein processing the scanned document content data to extract document content further comprises using character recognition and/or image processing techniques on the scanned document content data.

4. The method of claim 1, wherein the first machine-readable encoding comprises a two-dimensional bar code.

5. The method of claim 1, wherein processing the first scanned machine-readable encoding to extract document meta-data further comprises:
   decoding a second machine-readable encoding to obtain document meta-data for the face of the at least one page, wherein the second machine-readable encoding is identified by decoding the first machine-readable encoding, if the first machine-readable code does not contain document meta-data;
   decoding the first machine-readable code to obtain document meta-data for the at least one page, if the first machine-readable code contains document meta-data; and
   correlating the document meta-data with document content data.

6. The method of claim 1, wherein associating the extracted document meta-data with the extracted document content further comprises storing the extracted document meta-data as a document layer.

7. A computer-readable medium containing instructions for controlling a computer system to perform steps in a method for retrieving the content of document sections and meta-data associated with document sections, from a printed document containing a first machine-readable encoding, the steps comprising:
   scanning the printed document containing the first machine-readable encoding;
   processing the scanned document section data to extract document content by correlating the data with document content data;
   processing the scanned first machine-readable encoding to extract document meta-data, wherein the first machine-readable encoding encodes the location of a second machine-readable encoding on a second page containing document meta-data; and
   associating the extracted document meta-data with the extracted document content.

8. The computer-readable medium of claim 7, wherein processing the scanned first machine-readable encoding to extract document meta-data further comprises:
   correlating the data with document content data.

9. The computer-readable medium of claim 8, wherein associating the extracted document meta-data with the extracted document content further comprises storing the extracted document meta-data as a document layer.

* * * * *